US012614732B2

(12) United States Patent
Takagi et al.

(10) Patent No.: US 12,614,732 B2
(45) Date of Patent: Apr. 28, 2026

(54) COMPOSITION FOR ELECTROCHEMICAL DEVICE FUNCTIONAL LAYER, FUNCTIONAL LAYER FOR ELECTROCHEMICAL DEVICE, LAMINATE FOR ELECTROCHEMICAL DEVICE, AND ELECTROCHEMICAL DEVICE

(71) Applicant: ZEON CORPORATION, Tokyo (JP)

(72) Inventors: Kazuki Takagi, Tokyo (JP); Takuya Kaneda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 637 days.

(21) Appl. No.: 17/906,285

(22) PCT Filed: Mar. 12, 2021

(86) PCT No.: PCT/JP2021/010202
§ 371 (c)(1),
(2) Date: Sep. 14, 2022

(87) PCT Pub. No.: WO2021/200049
PCT Pub. Date: Oct. 7, 2021

(65) Prior Publication Data
US 2023/0155131 A1 May 18, 2023

(30) Foreign Application Priority Data
Mar. 31, 2020 (JP) ................................. 2020-064584

(51) Int. Cl.
*H01M 4/62* (2006.01)
*H01G 11/26* (2013.01)
*H01G 11/52* (2013.01)
*H01M 4/02* (2006.01)
*H01M 10/0525* (2010.01)
*H01M 50/446* (2021.01)
*H01M 50/449* (2021.01)

(52) U.S. Cl.
CPC ............ *H01M 4/622* (2013.01); *H01G 11/26* (2013.01); *H01G 11/52* (2013.01); *H01M 4/628* (2013.01); *H01M 10/0525* (2013.01); *H01M 50/446* (2021.01); *H01M 50/449* (2021.01); *H01M 2004/021* (2013.01); *Y02P 70/50* (2015.11)

(58) Field of Classification Search
CPC ...... H01G 11/52; H01M 4/622; H01M 4/628; H01M 2004/021
See application file for complete search history.

(56) References Cited

U.S. PATENT DOCUMENTS

| | | |
|---|---|---|
| 11,289,739 B2 | 3/2022 | Tanaka |
| 2017/0155107 A1* | 6/2017 | Akiike ................ H01M 50/403 |
| 2018/0053963 A1* | 2/2018 | Tanaka ............. H01M 10/0525 |
| 2018/0287189 A1 | 10/2018 | Maruhashi et al. |
| 2019/0214626 A1* | 7/2019 | Shibata .................. H01G 11/16 |
| 2020/0052270 A1 | 2/2020 | Sugimoto |
| 2020/0067047 A1 | 2/2020 | Sugimoto |

FOREIGN PATENT DOCUMENTS

| | | |
|---|---|---|
| CN | 107431169 A | 12/2017 |
| EP | 3474348 A1 | 4/2019 |
| JP | 2014060149 A | 4/2014 |
| JP | 2016134247 A * | 7/2016 |
| JP | 2018147578 A | 9/2018 |
| KR | 1020170129125 A | 11/2017 |
| WO | 2017073022 A1 | 5/2017 |
| WO | 2018034093 A1 | 2/2018 |
| WO | 2018034094 A1 | 2/2018 |

OTHER PUBLICATIONS

Calleja PTFE evidentiary reference (Year: 2013).*
Cappello polyurethanes evidentiary reference (Year: 2024).*
Gérard Calleja, 'Where is the glass transition temperature of poly(tetrafluoroethylene)? A new approach by dynamic rheometry and mechanical tests', May 11, 2013, ScienceDirect. (Year: 2013).*
Miriam Cappello, 'Waste Cooking Oil Derived Polyols to Produce New Sustainable Rigid Polyurethane Foams', Oct. 31, 2024, ResearchGate. (Year: 2024).*
May 25, 2021, International Search Report issued in the International Patent Application No. PCT/JP2021/010202.
Jun. 11, 2024, the Extended European Search Report issued by the European Patent Office in the corresponding European Patent Application No. 21780207.3.
Sep. 29, 2022, International Preliminary Report on Patentability issued in the International Patent Application No. PCT/JP2021/010202.

* cited by examiner

*Primary Examiner* — Maria Laios

(74) *Attorney, Agent, or Firm* — KENJA IP LAW PC

(57) ABSTRACT
A composition for an electrochemical device functional layer contains non-conductive heat-resistant particles and a particulate polymer having a particle diameter distribution value (Dv/Dn) of not less than 1.00 and less than 1.10.

5 Claims, No Drawings

COMPOSITION FOR ELECTROCHEMICAL DEVICE FUNCTIONAL LAYER, FUNCTIONAL LAYER FOR ELECTROCHEMICAL DEVICE, LAMINATE FOR ELECTROCHEMICAL DEVICE, AND ELECTROCHEMICAL DEVICE

TECHNICAL FIELD

The present disclosure relates to a composition for an electrochemical device functional layer, a functional layer for an electrochemical device, a laminate for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

A lithium ion secondary battery, for example, generally includes battery members such as a positive electrode, a negative electrode, and a separator that isolates the positive electrode and the negative electrode from each other and prevents short-circuiting between the positive and negative electrodes. There are cases in which a porous membrane layer for improving heat resistance and strength, an adhesive layer aimed at improving adhesiveness between battery members, or the like (hereinafter, such layers are also referred to collectively using the term "functional layer") is stacked on the surface of an electrode and/or a separator. More specifically, an electrode that is obtained by further forming a functional layer on an electrode substrate that includes an electrode mixed material layer on a current collector or a separator that is obtained by forming a functional layer on a separator substrate may be used as a battery member.

Attempts have been made to improve functional layers with the aim of achieving even higher secondary battery performance. As one example, Patent Literature (PTL) 1 discloses a composition for a non-aqueous secondary battery functional layer containing a particulate polymer that includes an aromatic monovinyl monomer unit and a polyvalent ethylenically unsaturated cross-linkable monomer unit in specific proportions, that has a volume-average particle diameter of not less than 0.5 μm and not more than 5 μm, and that has a degree of swelling in electrolyte solution of more than a factor of 1 and not more than a factor of 3. A functional layer formed using the composition for a functional layer according to PTL 1 can display high adhesive capability and can provide a secondary battery with excellent battery characteristics (particularly life characteristics and output characteristics). As another example, PTL 2 discloses a composition for a non-aqueous secondary battery porous membrane that contains inorganic particles having a volume-average particle diameter of not less than 0.1 μm and not more than 1.0 μm and a particulate polymer in a specific ratio. The volume-average particle diameter $d_1$ of the particulate polymer and the volume-average particle diameter $d_0$ of the inorganic particles satisfy a relationship $d_1/d_0 > 1$. A porous membrane formed using the composition for a porous membrane according to PTL 2 has a low tendency for blocking to occur, is easy to handle, and can provide a secondary battery with excellent battery characteristics (particularly life characteristics).

CITATION LIST

Patent Literature

PTL 1: WO2018/034093A1
PTL 2: WO2018/034094A1

SUMMARY

Technical Problem

However, there is room for further improvement in terms of adhesiveness of a functional layer that is obtained according to a conventionally proposed technique such as described above. There is also room for further improvement in terms of output characteristics and cycle characteristics of an electrochemical device including a functional layer obtained according to a conventionally proposed technique such as described above.

Accordingly, one object of the present disclosure is to provide a composition for a functional layer with which it is possible to form a functional layer that has excellent adhesiveness and can impart excellent output characteristics and cycle characteristics to an electrochemical device.

Another object of the present disclosure is to provide a functional layer for an electrochemical device that has excellent adhesiveness and can impart excellent output characteristics and cycle characteristics to an electrochemical device.

Another object of the present disclosure is to provide a laminate for an electrochemical device that can impart excellent output characteristics and cycle characteristics to an electrochemical device. Another object of the present disclosure is to provide an electrochemical device that can display excellent output characteristics and cycle characteristics.

Solution to Problem

The inventors conducted diligent investigation to achieve the objects set forth above. The inventors made a new discovery that by using a composition for an electrochemical device functional layer that contains non-conductive heat-resistant particles and a particulate polymer having a particle diameter distribution value that is within a specific range, it is possible to form a functional layer that has excellent adhesiveness and can impart excellent output characteristics and cycle characteristics to an electrochemical device, and, in this manner, the inventors completed the present disclosure.

Specifically, the present disclosure aims to advantageously solve the problems set forth above, and a presently disclosed composition for an electrochemical device functional layer comprises non-conductive heat-resistant particles and a particulate polymer, wherein the particulate polymer has a particle diameter distribution value, expressed by Dv/Dn, of not less than 1.00 and less than 1.10, where Dv is a value for volume-average particle diameter of the particulate polymer and Dn is a value for number-average particle diameter of the particulate polymer. Through the composition for a functional layer containing a particulate polymer having a particle diameter distribution value that is within a specific range in this manner, it is possible to form a functional layer that has excellent adhesiveness and can impart excellent output characteristics and cycle characteristics to an electrochemical device.

Note that the "volume-average particle diameter" and "number-average particle diameter" can be measured by a method described in the EXAMPLES section of the present specification.

In the presently disclosed composition for an electrochemical device functional layer, the volume-average particle diameter Dv of the particulate polymer is preferably not less than 1.0 μm and not more than 10.0 μm. When the volume-average particle diameter Dv of the particulate polymer contained in the composition for a functional layer is within the range set forth above, adhesiveness of an obtained functional layer can be further increased, and output characteristics and cycle characteristics of an obtained electrochemical device can be further enhanced.

In the presently disclosed composition for an electrochemical device functional layer, the volume-average particle diameter Dv of the particulate polymer is preferably 5 μm or less. When the volume-average particle diameter Dv of the particulate polymer is 5 μm or less, output characteristics and cycle characteristics of an obtained electrochemical device can be enhanced.

In the presently disclosed composition for an electrochemical device functional layer, the particulate polymer preferably has a glass-transition temperature of not lower than 10° C. and not higher than 90° C. When the particulate polymer contained in the composition for a functional layer has a glass-transition temperature that is within the range set forth above, adhesiveness of an obtained functional layer can be further increased, and blocking of an obtained functional layer can be inhibited.

Note that the "glass-transition temperature" can be measured by a method described in the EXAMPLES section of the present specification.

In the presently disclosed composition for an electrochemical device functional layer, the particulate polymer preferably includes a (meth)acrylic acid ester monomer unit. The inclusion of a (meth)acrylic acid ester monomer unit in the particulate polymer can further increase adhesiveness of an obtained functional layer.

Note that "(meth)acryl" is used to indicate "acryl" or "methacryl" in the present specification. Moreover, when a polymer is said to "include a monomer unit" in the present disclosure, this means that "a polymer obtained using that monomer includes a structural unit derived from the monomer".

The presently disclosed composition for an electrochemical device functional layer preferably further comprises a binder. When the composition for a functional layer contains a binder, adhesiveness of the non-conductive heat-resistant particles to one another can be increased through the binder, and adhesiveness of a functional layer and an adherend to which the functional layer adheres (for example, a separator substrate or an electrode substrate) can be further increased.

In the presently disclosed composition for an electrochemical device functional layer, it is preferable that the binder is a particulate binder and has a lower glass-transition temperature than the particulate polymer. When the composition for a functional layer contains a particulate binder having a lower glass-transition temperature than the particulate polymer, adhesiveness of an obtained functional layer can be further increased.

In the presently disclosed composition for an electrochemical device functional layer, the non-conductive heat-resistant particles preferably include inorganic particles.

When the composition for a functional layer contains inorganic particles, heat resistance of an obtained functional layer can be increased.

In the presently disclosed composition for an electrochemical device functional layer, the inorganic particles preferably contain at least one of alumina, boehmite, barium sulfate, and magnesium hydroxide. When the composition for a functional layer contains at least one of the inorganic compounds listed above as the non-conductive heat-resistant particles, heat resistance of an obtained functional layer can be increased.

Moreover, the present disclosure aims to advantageously solve the problems set forth above, and a presently disclosed functional layer for an electrochemical device is formed using any one of the compositions for an electrochemical device functional layer set forth above and comprises a non-conductive heat-resistant particle layer containing the non-conductive heat-resistant particles. A functional layer that is formed using the presently disclosed composition for a functional layer and that includes a non-conductive heat-resistant particle layer containing the non-conductive heat-resistant particles has excellent adhesiveness and can impart excellent output characteristics and cycle characteristics to an electrochemical device.

In the presently disclosed functional layer for an electrochemical device, a value obtained by dividing the volume-average particle diameter Dv of the particulate polymer by layer thickness of the non-conductive heat-resistant particle layer is preferably not less than 0.75 and not more than 4.00. A functional layer for which a value obtained by dividing the volume-average particle diameter Dv of the particulate polymer by the layer thickness of the non-conductive heat-resistant particle layer is within the range set forth above has even better adhesiveness.

In the presently disclosed functional layer for an electrochemical device, the value obtained by dividing the volume-average particle diameter Dv of the particulate polymer by the layer thickness of the non-conductive heat-resistant particle layer is preferably more than 1.00. When the value obtained by dividing the volume-average particle diameter Dv of the particulate polymer by the layer thickness of the non-conductive heat-resistant particle layer is more than 1.00, this means that the volume-average particle diameter Dv of the particulate polymer is larger than the layer thickness of the non-conductive heat-resistant particle layer. A functional layer satisfying this condition has even better adhesiveness.

In the presently disclosed functional layer for an electrochemical device, a buried fraction of the particulate polymer in the non-conductive heat-resistant particle layer is preferably 30% or less. When among a plurality of particles of the particulate polymer that are contained in the functional layer, the proportion constituted by particles of the particulate polymer that are buried in the non-conductive heat-resistant particle layer is 30 mass % or less, a sufficient proportion of the particulate polymer is present in a state protruding from the non-conductive heat-resistant particle layer, and thus adhesive capability through the particulate polymer can be displayed even better.

Note that the "buried fraction" of the particulate polymer in the non-conductive heat-resistant particle layer can be calculated by a method described in the EXAMPLES section of the present specification.

Furthermore, the present disclosure aims to advantageously solve the problems set forth above, and a presently disclosed laminate for an electrochemical device comprises any one of the functional layers for an electrochemical device set forth above stacked on a substrate. By using a laminate in which the presently disclosed functional layer is stacked on a substrate, it is possible to impart excellent output characteristics and cycle characteristics to an electrochemical device.

Also, the present disclosure aims to advantageously solve the problems set forth above, and a presently disclosed electrochemical device comprises any one of the functional layers for an electrochemical device set forth above. An electrochemical device that includes the presently disclosed functional layer for an electrochemical device can display excellent output characteristics and cycle characteristics.

Advantageous Effect

According to the present disclosure, it is possible to provide a composition for a functional layer with which it is possible to form a functional layer that has excellent adhesiveness and can impart excellent output characteristics and cycle characteristics to an electrochemical device.

Moreover, according to the present disclosure, it is possible to provide a functional layer for an electrochemical device that has excellent adhesiveness and can impart excellent output characteristics and cycle characteristics to an electrochemical device.

Furthermore, according to the present disclosure, it is possible to provide a laminate for an electrochemical device that can impart excellent output characteristics and cycle characteristics to an electrochemical device.

Also, according to the present disclosure, it is possible to provide an electrochemical device that can display excellent output characteristics and cycle characteristics.

DETAILED DESCRIPTION

The following provides a detailed description of embodiments of the present disclosure.

The presently disclosed composition for an electrochemical device functional layer (hereinafter, also referred to simply as a "composition for a functional layer") may be used as a material in formation of the presently disclosed functional layer for an electrochemical device (hereinafter, also referred to simply as a "functional layer"). Moreover, the presently disclosed functional layer for an electrochemical device is formed using the presently disclosed composition for an electrochemical device functional layer. Furthermore, the presently disclosed laminate for an electrochemical device is a member for an electrochemical device in which the presently disclosed functional layer is stacked on a substrate. Also, the presently disclosed electrochemical device is an electrochemical device that includes at least the presently disclosed functional layer for an electrochemical device.

(Composition for Electrochemical Device Functional Layer)

The presently disclosed composition for an electrochemical device functional layer contains non-conductive heat-resistant particles and a specific particulate polymer and can optionally further contain a binder, a solvent, and other components. By using the presently disclosed composition for a functional layer, it is possible to form a functional layer that has excellent adhesiveness and can impart excellent output characteristics and cycle characteristics to an electrochemical device.

<Non-Conductive Heat-Resistant Particles>

The non-conductive heat-resistant particles are particles that are not electrically conductive and that are heat resistant. Moreover, the non-conductive heat-resistant particles are particles that, in a situation in which a functional layer is formed, can maintain their shape in the functional layer. Furthermore, the non-conductive heat-resistant particles are electrochemically stable and are stably present in a functional layer in the environment of use of an electrochemical device. Accordingly, heat shrinkage resistance and strength can be imparted to an obtained functional layer as a result of the composition for a functional layer containing the non-conductive heat-resistant particles.

More specifically, the non-conductive heat-resistant particles can be organic particles or inorganic particles. Of such particles, it is preferable that inorganic particles are included among the non-conductive heat-resistant particles. When the composition for a functional layer contains inorganic particles, heat shrinkage resistance of an obtained functional layer can be further increased. Note that organic particles and inorganic particles may be used in combination in a freely selected ratio as the non-conductive heat-resistant particles.

<<Organic Particles>>

Examples of organic particles that may be used include various types of particles formed of polymers without any specific limitations. The organic particles preferably include polyfunctional ethylenically unsaturated monomer units such as ethylene glycol dimethacrylate units in a proportion of not less than 55 mass % and not more than 90 mass % and preferably include repeating units other than polyfunctional ethylenically unsaturated monomer units (i.e., other repeating units) in a proportion of not less than 10 mass % and not more than 45 mass %. Examples of polyfunctional ethylenically unsaturated monomers that can be used to form a polyfunctional ethylenically unsaturated monomer unit include monomers that include two or more ethylenically unsaturated bonds per molecule (excluding aliphatic conjugated diene monomers such as 1,3-butadiene). Examples of the other repeating units include a (meth)acrylic acid ester monomer unit such as subsequently described in the "Particulate polymer" section, and a nitrile group-containing monomer unit and an acid group-containing monomer unit such as subsequently described in the "Binder" section. Examples of organic particles that can suitably be used as the non-conductive heat-resistant particles include organic particles described in WO2019/065416A1, for example. One type of organic particles may be used individually, or two or more types of organic particles may be used in combination in a freely selected ratio. Organic particles serving as the non-conductive heat-resistant particles differ from the particulate polymer and the subsequently described binder in terms that the organic particles do not have binding capacity, whereas the particulate polymer and the binder do have binding capacity. More specifically, organic particles serving as the non-conductive heat-resistant particles preferably have a glass-transition temperature of 100° C. or higher, and more preferably have a glass-transition temperature of 200° C. or higher. Note that the glass-transition temperature of the particulate polymer is preferably 90° C. or lower and the glass-transition temperature of the binder is preferably lower than 30° C. as subsequently described.

The organic particles can be produced by performing polymerization in an aqueous solvent such as water, for example, with respect to a monomer composition that contains the monomers described above. The proportional content of each monomer in the monomer composition can be set in accordance with the proportional content of each repeating unit (monomer unit) in the organic particles.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. In the polymerization, seed particles may be used to perform seeded polymerization. The polymerization conditions can be adjusted as appropriate depending on the polymerization method and so forth.

Known additives such as emulsifiers, polymerization initiators, and chain transfer agents can be used in the polymerization, and the used amounts thereof can also be the same as typically used.

Examples of inorganic particles that may be used include, but are not specifically limited to, particles of oxides such as aluminum oxide (alumina), hydrous aluminum oxide (boehmite (AlOOH)), gibbsite ($Al(OH)_3$), silicon oxide, magnesium oxide (magnesia), magnesium hydroxide, calcium oxide, titanium oxide (titania), barium titanate ($BaTiO_3$), zirconium oxide (ZrO), and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc, montmorillonite, kaolin, and calcined kaolin. Of these inorganic particles, aluminum oxide (alumina), boehmite, barium sulfate, and magnesium hydroxide are preferable from a viewpoint of having excellent electrochemical stability. Note that one of these types of inorganic particles may be used individually, or two or more of these types of inorganic particles may be used in combination in a freely selected ratio.

<Volume-Average Particle Diameter of Non-Conductive Heat-Resistant Particles>

The volume-average particle diameter (D50) of the non-conductive heat-resistant particles is preferably 0.1 μm or more, more preferably 0.2 μm or more, and even more preferably 0.3 μm or more, and is preferably 1 μm or less, more preferably 0.9 μm or less, and even more preferably 0.8 μm or less. When the volume-average particle diameter of the non-conductive heat-resistant particles is not less than any of the lower limits set forth above, an excessive increase of density of the non-conductive heat-resistant particles in a functional layer can be inhibited, reduction of ion conductivity in the functional layer can be suppressed, and electrochemical characteristics (particularly output characteristics) of an electrochemical device can be improved. Moreover, when the volume-average particle diameter of the non-conductive heat-resistant particles is not more than any of the upper limits set forth above, the capacity of an electrochemical device can be increased.

<Particulate Polymer>

The particulate polymer contained in the composition for a functional layer is required to have a particle diameter distribution value, expressed by Dv/Dn, of not less than 1.00 and less than 1.10, where Dv is a value for the volume-average particle diameter of the particulate polymer and Dn is a value for the number-average particle diameter of the particulate polymer. The particulate polymer is a polymer that is present in a particulate form in the composition for a functional layer. Note that the particulate polymer may have a particulate form or may have any other form after members are adhered via a functional layer formed using the composition for a functional layer.

<<Particle Diameter Distribution Value (Dv/Dn) of Particulate Polymer>>

The particle diameter distribution value (Dv/Dn) of the particulate polymer is required to be not less than 1.00 and less than 1.10, and is preferably 1.06 or less, and more preferably 1.03 or less. When the particle diameter distribution value (Dv/Dn) is not less than 1.00 and less than 1.10, adhesiveness of an obtained functional layer can be increased, and output characteristics and cycle characteristics of an electrochemical device including the functional layer can be enhanced. In more detail, there is little variation of the particle diameter of the particulate polymer contained in the composition for a functional layer when the particle diameter distribution value (Dv/Dn) is not less than 1.00 and less than 1.10. This makes it possible to increase both adhesiveness of a functional layer at a stage prior to immersion in electrolyte solution (hereinafter, also referred to as "dry adhesiveness") and adhesiveness of the functional layer at a stage after immersion in electrolyte solution (hereinafter, also referred to as "wet adhesiveness"). When a functional layer has high dry adhesiveness, it is possible to increase the adhesive strength when members are adhered via the functional layer in a production process of an electrochemical device. Consequently, it is possible to inhibit peeling apart of members of a laminate that are adhered to each other during a production process of an electrochemical device, and thus the formation of defective products in the production process can be inhibited. Therefore, the inclusion of a particulate polymer having a particle diameter distribution value (Dv/Dn) of not less than 1.00 and less than 1.10 in the composition for a functional layer makes it possible to increase the ratio of good products in a production process. Moreover, as a result of the excellent wet adhesiveness of a functional layer that contains a particulate polymer having a particle diameter distribution value (Dv/Dn) of not less than 1.00 and less than 1.10, this functional layer can ensure a stacked structure of members well in a state in which they are incorporated into an electrochemical device and immersed in electrolyte solution. This can enhance cycle characteristics of the electrochemical device by inhibiting deterioration of the stacked structure in accompaniment to repeated charging and discharging, and can also enhance output characteristics of the electrochemical device by inhibiting reduction of conductivity of ions that contribute to electrochemical reactions inside the device. Note that reduction of conductivity of ions that contribute to electrochemical reactions inside a device can also be inhibited through the particle diameter distribution value (Dv/Dn) of the particulate polymer being less than or not more than any of the upper limits set forth above. In a situation in which there is large variation of the particle diameter of the particulate polymer, the proportion of the particulate polymer that becomes buried in a non-conductive heat-resistant particle layer and does not contribute to adhesion increases, and thus it may be necessary to add a larger amount of the particulate polymer in order to display the desired adhesiveness. Note that the particulate polymer can act as a resistance to ion conduction. By reducing variation of the particle diameter of the particulate polymer, it is possible to cause a functional layer to display the desired adhesiveness without the need to add a large amount of the particulate polymer. Accordingly, reducing variation of the particle diameter of the particulate polymer contained in the composition for a functional layer enables a balance of both adhesiveness and ion conductivity in an obtained functional layer.

In particular, when the particle diameter distribution value (Dv/Dn) of the particulate polymer is 1.06 or less, dry adhesiveness of an obtained functional layer can be further increased, and, as a result, the ratio of good products in production of an electrochemical device using the functional layer can be increased. Moreover, when the particle diameter distribution value (Dv/Dn) of the particulate polymer is 1.06 or less, output characteristics of an obtained electrochemical device can be further enhanced. Furthermore, when the particle diameter distribution value (Dv/Dn) of the particulate polymer is 1.03 or less, wet adhesiveness of an obtained functional layer can be further increased, and cycle characteristics of an obtained electrochemical device can be further enhanced.

Note that the particle diameter distribution value (Dv/Dn) of the particulate polymer can be adjusted through appropriate alteration of conditions in production of the particulate polymer. For example, in a case in which the particulate polymer is produced through seeded polymerization using seed particles and a monomer composition, a particulate polymer satisfying the desired particle diameter distribution value (Dv/Dn) can be obtained by obtaining seed particles satisfying a certain particle diameter distribution through appropriate adjustment of the types and amounts of a polymerization solvent, a polymerization initiator, and additives (pH buffer, dispersion stabilizer, etc.) optionally added to a reaction solution that are used in production of the seed particles, for example, and then using these seed particles and a monomer composition to perform seeded polymerization.

<<Volume-Average Particle Diameter Dv of Particulate Polymer>>

The volume-average particle diameter Dv of the particulate polymer is preferably 1.0 μm or more, more preferably 3.0 μm or more, and even more preferably 4.0 μm or more, and is preferably 10.0 μm or less, more preferably 6.0 μm or less, even more preferably 5.5 μm or less, and particularly preferably 5 μm or less. When the volume-average particle diameter Dv of the particulate polymer is not less than any of the lower limits set forth above, better dry adhesiveness and wet adhesiveness can be obtained in a situation in which the composition for a functional layer is used to form a functional layer. On the other hand, when the volume-average particle diameter Dv of the particulate polymer is not more than any of the upper limits set forth above, it is possible to form a thinner functional layer, which makes it possible to increase the energy density of an obtained electrochemical device. Consequently, even better dry adhesiveness and wet adhesiveness can be obtained, and output characteristics and cycle characteristics of an obtained electrochemical device can be further enhanced.

The volume-average particle diameter Dv of the particulate polymer can be adjusted through appropriate alteration of conditions in production of the particulate polymer. For example, in a case in which the particulate polymer is produced by seeded polymerization using seed particles and a monomer composition, the diameter of the obtained particulate polymer can be increased by increasing the ratio of the monomer composition relative to the seed particles, and, conversely, the diameter of the obtained particulate polymer can be reduced by reducing the ratio of the monomer composition relative to the seed particles.

<<Glass-Transition Temperature of Particulate Polymer>>

The glass-transition temperature (Tg) of the particulate polymer is preferably 10° C. or higher, more preferably 20° C. or higher, and even more preferably 30° C. or higher, and is preferably 90° C. or lower, more preferably 80° C. or lower, and even more preferably 70° C. or lower. When the glass-transition temperature of the particulate polymer is not lower than any of the lower limits set forth above, blocking of a functional layer can be inhibited while an electrochemical device including the functional layer is being stored, for example. On the other hand, when the glass-transition temperature of the particulate polymer is not higher than any of the upper limits set forth above, dry adhesiveness of a functional layer can be further increased.

<<Chemical Composition of Particulate Polymer>>

The chemical composition of the particulate polymer is not specifically limited so long as at least the particle diameter distribution value (Dv/Dn) is within a range of not less than 1.00 and less than 1.10.

Examples of monomer units that may form the particulate polymer include an aromatic vinyl monomer unit, a (meth)acrylic acid ester monomer unit, a cross-linkable monomer unit, and so forth. From a viewpoint of further increasing dry adhesiveness and wet adhesiveness of an obtained functional layer, it is preferable that the particulate polymer includes a (meth)acrylic acid ester monomer unit.

—Aromatic Vinyl Monomer Unit—

Examples of aromatic vinyl monomers that can form an aromatic vinyl monomer unit include, but are not specifically limited to, styrene, α-methylstyrene, styrene sulfonic acid, butoxystyrene, and vinylnaphthalene, of which, styrene is preferable.

Note that one of these aromatic vinyl monomers may be used individually, or two or more of these aromatic vinyl monomers may be used in combination in a freely selected ratio.

The proportional content of aromatic vinyl monomer units in the particulate polymer when all monomer units in the particulate polymer are taken to be 100 mass % is preferably 20 mass % or more, and more preferably 40 mass % or more, and is preferably 95 mass % or less, more preferably 90 mass % or less, and even more preferably 85 mass % or less. When the proportional content of aromatic vinyl monomer units is within any of the ranges set forth above, dry adhesiveness and wet adhesiveness of a functional layer can be further increased. In particular, when the proportional content of aromatic vinyl monomer units is not less than any of the lower limits set forth above, blocking of a functional layer can be inhibited.

Note that the "proportional content" of each "monomer unit" referred to in the present disclosure can be measured by a nuclear magnetic resonance (NMR) method such as $^1$H-NMR.

—(Meth)Acrylic Acid Ester Monomer Unit—

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate. Of these (meth)acrylic acid ester monomers, n-butyl acrylate, 2-ethylhexyl acrylate, and methyl methacrylate are preferable, and n-butyl acrylate is more preferable.

Note that one of these (meth)acrylic acid ester monomers may be used individually, or two or more of these (meth)acrylic acid ester monomers may be used in combination in a freely selected ratio.

The proportional content of (meth)acrylic acid ester monomer units in the particulate polymer when all repeating units of the particulate polymer are taken to be 100 mass % is preferably 10 mass % or more, and is preferably 70 mass % or less, more preferably 50 mass % or less, and even more preferably 40 mass % or less. When the proportional content of (meth)acrylic acid ester monomer units is not less than the lower limit set forth above, dry adhesiveness and wet adhesiveness of an obtained functional layer can be further increased. On the other hand, when the proportional content of (meth)acrylic acid ester monomer units is not more than any of the upper limits set forth above, excessive lowering of the glass-transition temperature of the particulate polymer can be avoided, and blocking resistance of an obtained functional layer can be improved.

—Cross-Linkable Monomer Unit—

A cross-linkable monomer unit is a monomer that can form a cross-linked structure during or after polymerization through heating or irradiation with energy rays. Examples of monomers that can form a cross-linkable monomer unit include polyfunctional monomers including two or more groups that display polymerization reactivity in the monomer. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these polyfunctional monomers, ethylene glycol dimethacrylate is preferable.

Note that one of these cross-linkable monomers may be used individually, or two or more of these cross-linkable monomers may be used in combination in a freely selected ratio.

The proportional content of cross-linkable monomer units in the particulate polymer when the amount of all monomer units of the particulate polymer is taken to be 100 mass % is preferably 0.02 mass % or more, and more preferably 0.10 mass % or more, and is preferably 2.0 mass % or less, more preferably 1.5 mass % or less, and even more preferably 1.0 mass % or less. When the proportional content of cross-linkable monomer units is within any of the ranges set forth above, elution of the particulate polymer into electrolyte solution can be sufficiently inhibited.

—Other Monomer Units—

The particulate polymer may include other monomer units besides the monomer units listed above. Examples of such other monomer units include, but are not specifically limited to, a nitrile group-containing monomer unit and an acid group-containing monomer unit such as subsequently described in the "Binder section", and a fluorine atom-containing monomer unit such as described below.

—Fluorine Atom-Containing Monomer Unit—

Examples of fluorine atom-containing monomers that can form a fluorine atom-containing monomer unit include, but are not specifically limited to, vinylidene fluoride, tetrafluoroethylene, hexafluoropropylene, chlorotrifluoroethylene, vinyl fluoride, and perfluoroalkyl vinyl ethers. Of these fluorine atom-containing monomers, vinylidene fluoride is preferable.

Note that one of these fluorine atom-containing monomers may be used individually, or two or more of these fluorine atom-containing monomers may be used in combination in a freely selected ratio.

The proportional content of other monomer units in the particulate polymer is preferably 20 mass % or less, more preferably 10 mass % or less, and even more preferably 5 mass % or less. When the proportional content of other monomer units is 20 mass % or less, reduction of stability of the composition for a functional layer can be inhibited.

The proportional content of the particulate polymer in the composition for a functional layer is preferably not less than 1 mass % and not more than 50 mass % relative to the total amount (100 mass %) of the particulate polymer, the binder, and the non-conductive heat-resistant particles.

[Production of Particulate Polymer]

The particulate polymer can be produced by performing polymerization in a solvent with respect to a monomer composition that contains the monomers described above. The proportion constituted by each monomer in the monomer composition is normally the same as the proportion constituted by each monomer unit in the particulate polymer.

The method of polymerization is not specifically limited and may be suspension polymerization, emulsion polymerization, or the like, for example. Of these polymerization methods, emulsion polymerization using seed particles and suspension polymerization accompanied by classification are preferable from a viewpoint of easily adjusting the particle diameter distribution value (Dv/Dn) of the particulate polymer to within a range of not less than 1.00 and less than 1.10. Note that although no specific limitations are placed on the polymerization method of seed particles in a case in which emulsion polymerization using seed particles is selected, seed particles having a well-controlled particle diameter distribution value can be obtained by emulsion polymerization in which a pH buffer, a dispersion stabilizer, and/or the like is optionally used, for example. In particular, it is preferable to use seed particles that are obtained by emulsion polymerization in the presence of a pH buffer. Moreover, when performing a polymerization reaction (seeded polymerization) using seed particles, it is preferable to perform swollen seed polymerization in which seed particles are caused to swell through a plasticizer such as dibutyl phthalate and then seeded polymerization is performed. The polymerization reaction may be radical polymerization, living radical polymerization, or the like.

The amounts of various additives (pH buffers, dispersants, polymerization initiators, polymerization aids, etc.) that are optionally used in the polymerization may be the same as typically used.

<Binder>

The binder contained in the composition for a functional layer is used in order to inhibit components such as the particulate polymer that are contained in a functional layer formed using the presently disclosed composition for a functional layer from becoming detached from the functional layer. The binder is preferably a particulate binder that has a particulate form in the composition for a functional layer. Note that the particulate binder may have a particulate form or may have any other form after members are adhered via a functional layer formed using the composition for a functional layer. When the binder contained in the composition for a functional layer is a particulate binder, detachment of components contained in a functional layer can be inhibited well.

The binder may be any known polymer that is water-insoluble and can be dispersed in a dispersion medium such as water without any specific limitations. Of such known polymers, conjugated diene polymers and acrylic polymers are preferable, and acrylic polymers are more preferable.

Note that one of these binders may be used individually, or two or more of these binders may be used in combination in a freely selected ratio.

The term "conjugated diene polymer" refers to a polymer that includes a conjugated diene monomer unit. Specific examples of conjugated diene polymers include, but are not specifically limited to, copolymers that include an aromatic vinyl monomer unit and an aliphatic conjugated diene monomer unit such as a styrene-butadiene copolymer (SBR), butadiene rubber (BR), acrylic rubber (NBR) (copolymer including an acrylonitrile unit and a butadiene unit), and hydrogenated products thereof.

The term "acrylic polymer" refers to a polymer that includes a (meth)acrylic acid ester monomer unit. Examples of acrylic polymers that can preferably be used as the binder include, but are not specifically limited to, polymers that include a (meth)acrylic acid ester monomer unit and a cross-linkable monomer unit such as previously described and also include an acid group-containing monomer unit and a nitrile group-containing monomer unit such as described below.

—Acid Group-Containing Monomer Unit—

Examples of acid group-containing monomers that can form an acid group-containing monomer unit include carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Note that "(meth)allyl" is used to indicate "allyl" or "methallyl" in the present specification.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that "(meth)acryloyl" is used to indicate "acryloyl" or "methacryloyl" in the present specification.

Examples of hydroxy group-containing monomers include 2-hydroxyethyl acrylate, 2-hydroxypropyl acrylate, 2-hydroxyethyl methacrylate, and 2-hydroxypropyl methacrylate.

Note that one of these acid group-containing monomers may be used individually, or two or more of these acid group-containing monomers may be used in combination in a freely selected ratio.

—Nitrile Group-Containing Monomer Unit—

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile.

Note that one of these nitrile group-containing monomers may be used individually, or two or more of these nitrile group-containing monomers may be used in combination in a freely selected ratio.

—Proportional Content of Each Monomer Unit in Acrylic Polymer Serving as Binder—

The proportion constituted by (meth)acrylic acid ester monomer units in an acrylic polymer serving as the binder is preferably 50 mass % or more, more preferably 55 mass % or more, and even more preferably 58 mass % or more, and is preferably 98 mass % or less, more preferably 97 mass % or less, and even more preferably 96 mass % or less. Through the proportion constituted by (meth)acrylic acid ester monomer units being not less than any of the lower limits set forth above, dry adhesiveness and wet adhesiveness of a functional layer can be further increased. Moreover, through the proportion constituted by (meth)acrylic acid ester monomer units being not more than any of the upper limits set forth above, electrochemical characteristics of an electrochemical device including a functional layer can be further enhanced.

The proportion constituted by cross-linkable monomer units in the acrylic polymer serving as the binder is preferably 0.1 mass % or more, and more preferably 1.0 mass % or more, and is preferably 3.0 mass % or less, and more preferably 2.5 mass % or less. Through the proportion constituted by cross-linkable monomer units being not less than any of the lower limits set forth above, electrochemical characteristics of an electrochemical device including a functional layer can be further enhanced. Moreover, through the proportion constituted by cross-linkable monomer units being not more than any of the upper limits set forth above, dry adhesiveness and wet adhesiveness of a functional layer can be further increased.

The proportion constituted by acid group-containing monomer units in the acrylic polymer serving as the binder is preferably 0.1 mass % or more, more preferably 0.3 mass % or more, and even more preferably 0.5 mass % or more, and is preferably 20 mass % or less, more preferably 10 mass % or less, and even more preferably 5 mass % or less. Through the proportion constituted by acid group-containing monomer units being not less than any of the lower limits set forth above, dispersibility of the binder in the composition for a functional layer and in a functional layer can be increased, and electrochemical characteristics of an electrochemical device including the functional layer can be sufficiently enhanced. Moreover, through the proportion constituted by acid group-containing monomer units being not more than any of the upper limits set forth above, residual water content in a functional layer can be reduced, and electrochemical characteristics of an electrochemical device can be sufficiently enhanced.

The proportional content of nitrile group-containing monomer units in the acrylic polymer serving as the binder when all repeating units in the acrylic polymer are taken to be 100 mass % is preferably 1 mass % or more, and more preferably 2 mass % or more, and is preferably 30 mass % or less, and more preferably 20 mass % or less. When the proportional content of nitrile group-containing monomer units is not less than any of the lower limits set forth above, binding strength of the acrylic polymer can be improved, and dry adhesiveness and wet adhesiveness of a functional layer can be further increased. On the other hand, when the proportional content of nitrile group-containing monomer units is not more than any of the upper limits set forth above, flexibility of the acrylic polymer can be increased.

The acrylic polymer serving as the binder may include other monomer units. Examples of other monomers that can form other monomer units that can be included in the acrylic polymer include aliphatic conjugated diene monomers such as 1,3-butadiene, 2-methyl-1,3-butadiene, 2,3-dimethyl-1,3-butadiene, and 2-chloro-1,3-butadiene; aromatic vinyl monomers previously described in the "Chemical composition of particulate polymer" section; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocycle-containing vinyl compound monomers such as N-vinylpyrrolidone, vinylpyridine, and vinylimidazole.

Note that one of these other monomers may be used individually, or two or more of these other monomers may be used in combination in a freely selected ratio. The proportional content of other monomer units in the acrylic polymer may be adjusted as appropriate.

<<Glass-Transition Temperature of Binder>>

The glass-transition temperature (Tg) of the binder is preferably lower than that of the particulate polymer. Through the glass-transition temperature of the binder being lower than the glass-transition temperature of the particulate polymer, dry adhesiveness and wet adhesiveness of an obtained functional layer can be further increased. The glass-transition temperature of the binder is preferably −100° C. or higher, more preferably −90° C. or higher, and even more preferably −80° C. or higher, and is preferably lower than 30° C., more preferably 20° C. or lower, and even more preferably 15° C. or lower. When the glass-transition temperature of the binder is not lower than any of the lower limits set forth above, adhesiveness and strength of the binder can be increased. On the other hand, when the glass-transition temperature of the binder is not higher than any of the upper limits set forth above, flexibility of a functional layer can be further increased.

<<Volume-Average Particle Diameter of Binder>>

The volume-average particle diameter of the binder is preferably not less than 0.1 μm and not more than 0.4 μm. When the volume-average particle diameter of the binder is not less than the lower limit set forth above, reduction of ion conductivity in a functional layer can be further inhibited, and output characteristics of an electrochemical device can be improved. On the other hand, when the volume-average particle diameter of the binder is not more than the upper limit set forth above, dry adhesiveness and wet adhesiveness of an obtained functional layer can be further increased.

Note that the volume-average particle diameter of the binder can be measured by a method described in the EXAMPLES section of the present specification.

[Content of Binder]

The content of the binder in a functional layer is preferably 0.1 parts by mass or more, more preferably 0.2 parts by mass or more, and even more preferably 0.5 parts by mass or more per 100 parts by mass, in total, of the non-conductive heat-resistant particles and the particulate polymer, and is preferably 20 parts by mass or less, more preferably 15 parts by mass or less, and even more preferably 10 parts by mass or less per 100 parts by mass, in total, of the non-conductive heat-resistant particles and the particulate polymer. When the content of the binder in a functional layer is not less than any of the lower limits set forth above, detachment of the particulate polymer from the functional layer can be sufficiently prevented, and dry adhesiveness and wet adhesiveness of the functional layer can be sufficiently increased. On the other hand, when the content of the binder in a functional layer is not more than any of the upper limits set forth above, reduction of ion conductivity of the functional layer can be inhibited, and deterioration of output characteristics of an electrochemical device can be inhibited.

The binder can be produced by performing polymerization in an aqueous solvent such as water, for example, with respect to a monomer composition that contains the monomers described above, for example, but is not specifically limited to being produced in this manner. The proportion constituted by each monomer in the monomer composition is normally the same as the proportion constituted by each monomer unit in the binder.

The polymerization method and the polymerization reaction are not specifically limited and may, for example, be any of the polymerization methods and polymerization reactions given as examples for the polymerization method of the previously described particulate polymer.

<Mixing Ratio of Non-Conductive Heat-Resistant Particles and Particulate Polymer>

The mixing ratio of the non-conductive heat-resistant particles and the particulate polymer in the composition for a functional layer, in terms of volume ratio (non-conductive heat-resistant particles/particulate polymer), is preferably 1.2 or more, more preferably 1.5 or more, and even more preferably 2.5 or more, and is preferably 99 or less, more preferably 20 or less, even more preferably 15 or less, and particularly preferably 10 or less. When the mixing ratio of the non-conductive heat-resistant particles and the particulate polymer is a volume ratio within any of the ranges set forth above, this provides a good balance of heat resistance and adhesiveness displayed by a functional layer.

<Other Components>

The composition for a functional layer may contain any other components besides the components described above. These other components are not specifically limited so long as they do not affect electrochemical reactions inside an electrochemical device and examples thereof include known additives such as dispersants, viscosity modifiers, and wetting agents. One of these other components may be used individually, or two or more of these other components may be used in combination.

<Production Method of Composition for Electrochemical Device Functional Layer>

No specific limitations are placed on the method by which the composition for a functional layer is produced. For example, the composition for a functional layer can be produced by mixing the previously described particulate polymer and non-conductive heat-resistant particles, and also the binder, water serving as a dispersion medium, and other components that are optional components. Note that in a case in which the particulate polymer or binder is produced through polymerization of a monomer composition in an aqueous solvent, the particulate polymer or binder may be mixed with the other components in that form as a water dispersion. Moreover, in a case in which the particulate polymer or binder is mixed in the form of a water dispersion, water in that water dispersion may be used as the dispersion medium.

Although no specific limitations are placed on the mixing method of these components, the mixing is preferably performed using a disperser as a mixing device in order to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

(Functional Layer for Electrochemical Device and Laminate for Electrochemical Device)

The presently disclosed functional layer for an electrochemical device is a functional layer for an electrochemical device that is formed using the presently disclosed composition for a functional layer set forth above. The presently disclosed functional layer for an electrochemical device includes a non-conductive heat-resistant particle layer that contains non-conductive heat-resistant particles. As a result of being formed using the presently disclosed composition for a functional layer, the functional layer contains non-conductive heat-resistant particles and a particulate polymer having a particle diameter distribution value of not less than 1.00 and less than 1.10, and thus has excellent adhesiveness and can impart excellent output characteristics and cycle characteristics to an electrochemical device. In addition, the functional layer can optionally contain a binder and other components. Note that components contained in the functional layer are components that were contained in the composition for a functional layer set forth above, and the preferred ratio of these components is the same as the preferred ratio of the components in the composition for a functional layer.

The presently disclosed laminate for an electrochemical device includes the presently disclosed functional layer stacked on a substrate. By using a laminate in which the presently disclosed functional layer is stacked on a substrate, it is possible to impart excellent output characteristics and cycle characteristics to an electrochemical device. The substrate is not specifically limited and may, for example, be an electrode substrate that includes an electrode mixed material layer on a current collector or a separator substrate. The electrode substrate and the separator substrate may be known examples thereof without any specific limitations. In particular, it is preferable that the substrate included in the presently disclosed laminate for an electrochemical device is a separator substrate.

The presently disclosed functional layer and the presently disclosed laminate for an electrochemical device including this functional layer can be formed by, for example, using the presently disclosed composition for a functional layer on a suitable substrate. The method by which the composition for a functional layer is used on a suitable substrate is not specifically limited and examples thereof include:

(1) a method in which the composition for a functional layer is applied onto the surface of a substrate and is then dried;

(2) a method in which a substrate is immersed in the composition for a functional layer and is then dried; and (3) a method in which the composition for a functional layer is applied onto a releasable substrate and is dried to form a functional layer that is then transferred onto the surface of a substrate.

Note that the functional layer may be formed at just one side of the substrate or at both sides of the substrate.

Of these methods, method (1) is preferable in terms of ease of control of the thickness of the functional layer. Method (1) may, for example, include a step of applying the composition for a functional layer onto a substrate (application step) and a step of drying the composition for a functional layer that has been applied onto the substrate so as to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The composition for a functional layer on the substrate may be dried by any commonly known method in the functional layer formation step, without any specific limitations. For example, the drying method may be drying by warm, hot, or low-humidity air; drying in a vacuum; or drying by irradiation with infrared light, electron beams, or the like. Although no specific limitations are placed on the drying conditions, the drying temperature is preferably 50° C. to 150° C., and the drying time is preferably 1 minute to 30 minutes.

The functional layer formed on the substrate can suitably be used as a single layer that simultaneously displays functionality as a heat-resistant layer that increases heat resistance of the substrate and functionality as an adhesive layer that strongly adheres members to each other.

Moreover, a laminate for an electrochemical device formed using the composition for a functional layer in this manner can be produced with reduced workload and time compared to a conventional substrate that includes a heat-resistant layer and an adhesive layer, thereby enabling high productivity.

The presently disclosed functional layer includes a non-conductive heat-resistant particle layer that contains non-conductive heat-resistant particles. In the non-conductive heat-resistant particle layer, a plurality of non-conductive heat-resistant particles are typically arranged such as to overlap with one another in the thickness direction. The thickness of the non-conductive heat-resistant particle layer is preferably 0.5 $\mu$m or more, more preferably 0.8 $\mu$m or more, and even more preferably 1 $\mu$m or more, and is preferably 6 $\mu$m or less, more preferably 5 $\mu$m or less, and even more preferably 4 $\mu$m or less. When the thickness of the non-conductive heat-resistant particle layer is not less than any of the lower limits set forth above, heat resistance of the functional layer can be increased. On the other hand, when the thickness of the non-conductive heat-resistant particle layer is not more than any of the upper limits set forth above, ion permeability of the functional layer can be increased to thereby further enhance output characteristics of an electrochemical device.

[Value Obtained by Dividing Volume-Average Particle Diameter Dv of Particulate Polymer by Layer Thickness of Non-Conductive Heat-Resistant Particle Layer]

A value obtained by dividing the volume-average particle diameter Dv of the particulate polymer by the layer thickness of the non-conductive heat-resistant particle layer in the presently disclosed functional layer is preferably 0.75 or more, more preferably more than 1.00, and more preferably 1.20 or more, and is preferably 4.00 or less, more preferably 3.00 or less, and even more preferably 2.00 or less. When the value obtained by dividing the volume-average particle diameter Dv of the particulate polymer by the layer thickness of the non-conductive heat-resistant particle layer in the functional layer (i.e., a ratio of the volume-average particle diameter Dv of the particulate polymer relative to the layer thickness of the non-conductive heat-resistant particle layer) is not less than or more than any of the lower limits set forth above, the functional layer has even better dry adhesiveness and wet adhesiveness. Note that when the value obtained by dividing the volume-average particle diameter Dv of the particulate polymer by the layer thickness of the non-conductive heat-resistant particle layer is more than 1.00, this means that the volume-average particle diameter Dv of the particulate polymer is larger than the layer thickness of the non-conductive heat-resistant particle layer. A functional layer that satisfies this condition can display even better adhesive capability through the particulate polymer as a result of having a structure in which a portion of the particulate polymer protrudes from the non-conductive heat-resistant particle layer. Moreover, when the value obtained by dividing the volume-average particle diameter Dv of the particulate polymer by the layer thickness of the non-conductive heat-resistant particle layer is not more than any of the upper limits set forth above, the particulate polymer can be inhibited from detaching from the functional layer during application of the composition for a functional layer onto a substrate and in a state in which the functional layer has been formed, and good adhesiveness can be maintained.

<Buried Fraction of Particulate Polymer in Non-Conductive Heat-Resistant Particle Layer>

The buried fraction of the particulate polymer in the non-conductive heat-resistant particle layer in the presently disclosed functional layer is preferably 30% or less, more preferably 20% or less, even more preferably 10% or less, and particularly preferably 5% or less. The buried fraction of the particulate polymer in the non-conductive heat-resistant particle layer is a value that indicates a proportion of the number of particles of the particulate polymer that are buried in the non-conductive heat-resistant particle layer among 100 arbitrarily selected particles of the particulate polymer contained in the functional layer. Accordingly, a larger value for the buried fraction indicates that the number of particles of the particulate polymer that are buried in the non-conductive heat-resistant particle layer (i.e., that do not have a section protruding from the non-conductive heat-resistant particle layer) constitutes a larger proportion. When the value of the buried fraction is not more than any of the upper limits set forth above, dry adhesiveness and wet adhesiveness of the functional layer can be further increased, and output characteristics and cycle characteristics of an obtained secondary battery can be enhanced. The lower limit for the value of the buried fraction is not specifically limited and may be 0%. When the buried fraction is 0%, this indicates that every one of 100 arbitrarily selected particles of the particulate polymer contained in the functional layer is not buried in the non-conductive heat-resistant particle layer, and thus, in other words, has a section that protrudes from the non-conductive heat-resistant particle layer.

(Electrochemical Device)

The presently disclosed electrochemical device including a functional layer includes at least the presently disclosed functional layer. The presently disclosed electrochemical device can display excellent output characteristics and cycle characteristics as a result of including the presently disclosed functional layer. In addition, the presently disclosed electrochemical device may include constituent elements other than the presently disclosed functional layer so long as the disclosed effects are not significantly lost.

The presently disclosed electrochemical device may be, but is not specifically limited to, a lithium ion secondary battery or an electric double-layer capacitor, and is preferably a lithium ion secondary battery.

The following describes a lithium ion secondary battery as one example of the presently disclosed electrochemical device. A lithium ion secondary battery according to the present disclosure includes the presently disclosed functional layer set forth above. More specifically, the lithium ion secondary battery preferably includes a positive electrode, a negative electrode, a separator (functional layer-equipped separator) having the presently disclosed functional layer formed on a separator substrate (i.e., a laminate having the presently disclosed functional layer stacked on a separator substrate), and an electrolyte solution. The functional layer may be formed on just one side of the separator substrate or may be formed on both sides of the separator substrate.

The lithium ion secondary battery according to one example of the presently disclosed electrochemical device has strong adhesion between the positive electrode and the separator substrate and/or between the negative electrode and the separator substrate in the electrolyte solution through the functional layer. Consequently, widening of the distance between electrode plates of the electrodes in accompaniment to repeated charging and discharging is inhibited, and good output characteristics and cycle characteristics are achieved. Moreover, heat resistance of the separator substrate is increased in this lithium ion secondary battery through the functional layer that includes a non-conductive heat-resistant particle layer. Furthermore, this lithium ion secondary battery requires less time for separator production and can be produced with high productivity compared to in a case in which a conventional separator that includes a heat-resistant layer and an adhesive layer is used.

Note that the aforementioned positive electrode, negative electrode, and electrolyte solution can be any known positive electrode, negative electrode, and electrolyte solution that are used in lithium ion secondary batteries.

<Positive Electrode and Negative Electrode>

The electrodes (positive electrode and negative electrode) may, more specifically, each be an electrode that is obtained by forming an electrode mixed material layer on a current collector. The current collector may be made of a metal material such as iron, copper, aluminum, nickel, stainless steel, titanium, tantalum, gold, or platinum. Of these metal materials, the current collector for the negative electrode is preferably made of copper. Moreover, the current collector for the positive electrode is preferably made of aluminum. The electrode mixed material layer can be a layer containing an electrode active material and a binder.

<Functional Layer-Equipped Separator>

The functional layer-equipped separator can be produced by forming the functional layer on the separator substrate using any of the methods of forming a functional layer that were previously described in the "Functional layer for electrochemical device and laminate for electrochemical device" section, for example.

The separator substrate is not specifically limited and can be any of those described in JP2012-204303A, for example. Of these separator substrates, a microporous membrane made of polyolefinic resin (polyethylene, polypropylene, polybutene, or polyvinyl chloride) is preferred since such a membrane can reduce the total thickness of the functional layer-equipped separator, which increases the ratio of electrode active material in the lithium ion secondary battery, and consequently increases the volumetric capacity.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixture of these organic solvents may be used. Of these organic solvents, carbonates are preferable due to having high permittivity and a wide stable potential region. In general, lithium ion conductivity tends to increase when an organic solvent having a low viscosity is used. Therefore, lithium ion conductivity can be adjusted through the type of organic solvent that is used.

The concentration of the electrolyte in the electrolyte solution may be adjusted as appropriate. Furthermore, known additives may be added to the electrolyte solution.

<Production Method of Lithium Ion Secondary Battery>

The lithium ion secondary battery that is one example of the presently disclosed electrochemical device can be produced by, for example, stacking the above-described positive electrode and negative electrode with the functional layer-equipped separator in-between, performing rolling, folding, or the like of the resultant laminate, as necessary, to place the laminate in a battery container, injecting the electrolyte solution into the battery container, and sealing the battery container. In order to prevent pressure increase inside the battery and occurrence of overcharging or over-discharging, an expanded metal; an overcurrent preventing device such as a fuse or a PTC device; or a lead plate may be placed in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified. Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer. Various measurements and evaluations in the examples and comparative example were performed as follows.

<Glass-Transition Temperature>

A particulate polymer or binder produced in each example or comparative example was used as a measurement sample. The measurement sample was weighed into an aluminum pan in an amount of 10 mg and was then measured by a differential scanning calorimeter (EXSTAR DSC6220 produced by SII NanoTechnology Inc.) under conditions prescribed in JIS Z 8703 with a measurement temperature range of −100° C. to 500° C. and a heating rate of 10° C./min and with an empty aluminum pan as a reference so as to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter and Number-Average Particle Diameter>

A particulate polymer or binder produced in each example or comparative example was used as a measurement sample. The volume-average particle diameter of the measurement sample was measured by laser diffraction. Specifically, a produced water dispersion of a particulate polymer or binder (adjusted to a solid content concentration of 0.1 mass %) was used as a measurement sample. The particle diameter Dv50 at which, in a particle diameter distribution (by volume) measured using a laser diffraction particle size analyzer (LS-230 produced by Beckman Coulter, Inc), cumulative volume calculated from a small diameter end of the distribution reached 50% was taken to be the volume-average particle diameter. Note that a particle diameter distribution by number was also measured in the case of a particulate polymer, and the particle diameter Dn50 at which the cumulative number of particles calculated from a small diameter end of the distribution reached 50% was taken to be the number-average particle diameter (Dn). Moreover, the volume-average particle diameter Dv and the number-average particle diameter Dn obtained for a particulate polymer were used to calculate a particle diameter distribution value expressed by Dv/Dn.

<Buried Fraction>

A functional layer-equipped separator (laminate for an electrochemical device) produced in each example or comparative example was processed by a Cross Section Polisher (produced by JEOL Ltd.) to produce a sample for cross-section observation. The obtained sample for cross-section observation was observed using a scanning electron microscope (JSM-7800F produced by JEOL Ltd.), and a cross-sectional image thereof was obtained. One hundred particles of a particulate polymer were randomly extracted from the obtained cross-sectional image, each of these particles was classified as being buried or not being buried in a non-conductive heat-resistant particle layer, and the number of buried particles of the particulate polymer was divided by 100 (number of extracted particles) to calculate the buried fraction. In classification of particles of the particulate polymer, particles that were completely buried in the non-conductive heat-resistant particle layer and did not have a section protruding from the surface of the non-conductive heat-resistant particle layer were classified as "buried", whereas other particles of the particulate polymer were classified as "not buried".

<Thickness of Non-Conductive Heat-Resistant Particle Layer>

A cross-section of a functional layer-equipped separator was observed using a field emission scanning electron microscope (FE-SEM), and the thickness of a non-conductive heat-resistant particle layer was calculated from an obtained image. Note that the thickness of the non-conductive heat-resistant particle layer was taken to be the vertical direction distance from the surface of the separator at a side at which the functional layer was formed to the surface of non-conductive heat-resistant particles forming the surface of the functional layer.

<Mixing Ratio of Non-Conductive Heat-Resistant Particles and Particulate Polymer>

A mixing ratio (volume ratio) of non-conductive heat-resistant particles and a particulate polymer was calculated from charged amounts of the non-conductive heat-resistant particles and the particulate polymer in production of a slurry composition.

<Dry Adhesiveness>

A positive electrode and a functional layer-equipped separator produced in each example or comparative example were each cut out as 10 mm in width and 50 mm in length, were then stacked such that the surface at a positive electrode mixed material layer-side of the positive electrode and the separator were facing each other, and were pressed by roll pressing under conditions of a temperature of 70° C., a load of 10 kN/m, and a pressing rate of 30 m/min so as to obtain a joined product in which the positive electrode and the functional layer-equipped separator were joined together.

The resultant joined product was placed with the surface at a current collector-side of the positive electrode facing downward, and cellophane tape was affixed to the surface of the positive electrode. Tape prescribed by JIS Z1522 was used as the cellophane tape. The cellophane tape was fixed to a horizontal test stage in advance. Thereafter, one end of the functional layer-equipped separator was pulled vertically upward at a pulling speed of 50 mm/min to peel off the functional layer-equipped separator, and the stress during this peeling was measured.

The same operations as for the positive electrode were also performed for a negative electrode produced in each example or comparative example to perform stress measurement.

The stress measurement described above was performed 10 times in total for 5 joined products of a positive electrode and a functional layer-equipped separator and for 5 joined products of a negative electrode and a functional layer-equipped separator, an average value for the stress was calculated, and the obtained average value was taken to be the peel strength P1 (N/m).

The dry adhesiveness between an electrode and a functional layer-equipped separator was evaluated by the following standard using the calculated peel strength P1. A larger peel strength P1 indicates higher dry adhesiveness. Higher dry adhesiveness indicates higher adhesiveness of a member for an electrochemical device during a production process of an electrochemical device.

A: Peel strength P1 of 6 N/m or more

B: Peel strength P1 of not less than 4 N/m and less than 6 N/m

C: Peel strength P1 of not less than 2 N/m and less than 4 N/m

D: Peel strength P1 of less than 2 N/m

<Wet Adhesiveness>

A composition for a functional layer obtained in each example or comparative example was applied onto a separator, and the composition for a functional layer on the separator substrate was dried at 50° C. for 10 minutes to form a functional layer. The separator including this functional layer was used as a separator for evaluation and was cut out as a strip shape of 10 mm×100 mm. The separator was placed along the surface (negative electrode mixed material layer-side) of a negative electrode and was then heat pressed for 6 minutes at a temperature of 85° C. and a pressure of 0.5 MPa to produce a laminate including the negative electrode and the separator. This laminate was taken to be a test specimen.

The test specimen was placed in laminate packing with approximately 400 μL of electrolyte solution. After 1 hour, the test specimen was pressed, together with the laminate packing, for 15 minutes at 60° C. with a pressure of 0.5 MPa. The test specimen was held at a temperature of 60° C. for 1 day after the pressing. Note that a solution obtained by dissolving $LiPF_6$ as a supporting electrolyte with a concentration of 1 mol/L in a mixed solvent of EC, DEC, and vinylene carbonate (VC) (EC/DEC/VC (volume mixing ratio at 25° C.)=68.5/30/1.5) was used as the electrolyte solution.

The test specimen was then taken out, and electrolyte solution attached to the surface of the test specimen was wiped off. Next, the test specimen was placed with the surface at a current collector-side of the negative electrode facing downward, and cellophane tape was affixed to the surface at the current collector-side of the negative electrode. Tape prescribed by JIS Z1522 was used as the cellophane tape. The cellophane tape was fixed to a horizontal test stage in advance. Next, one end of the separator was pulled vertically upward at a pulling speed of 50 mm/min to peel off the separator, and the stress during this peeling was measured. Three measurements were made in this manner. An average value of the stress was calculated as the peel strength P2 and was evaluated by the following standard. A larger peel strength P2 indicates higher adhesiveness of a functional layer in a wet state. Higher adhesiveness of a functional layer in a wet state indicates better adhesiveness of the functional layer in electrolyte solution and stronger adhesion of adherends that are adhered to each other via the functional layer.

A: Peel strength P2 of 4 N/m or more

B: Peel strength P2 of not less than 3 N/m and less than 4 N/m

C: Peel strength P2 of not less than 2 N/m and less than 3 N/m

D: Peel strength P2 of less than 2 N/m

<Ratio of Good Products>

A total of 100 measurements were made by the same method as described in the "Dry adhesiveness" section for 50 joined products of a positive electrode and a functional layer-equipped separator and 50 joined products of a negative electrode and a functional layer-equipped separator. The number of samples among the above for which the peel strength P1 was less than 1 N/m was counted and was evaluated by the following standard.

A: 0 samples

B: Not fewer than 1 and fewer than 3 samples

C: Not fewer than 3 and fewer than 6 samples

D: 6 or more samples

<Cycle Characteristics>

A lithium ion secondary battery produced as an electrochemical device in each example or comparative example was left at rest at a temperature of 25° C. for 5 hours. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25°

C. Thereafter, the lithium ion secondary battery was CC-CV charged by a 0.2 C constant-current method (upper limit cell voltage 4.40 V) and was then CC discharged to 3.00 V by a 0.2 C constant-current method. This charging and discharging at 0.2 C was repeated three times.

Thereafter, the lithium ion secondary battery was subjected to 100 cycles of a charge/discharge operation with a cell voltage of 4.40 V to 3.00 V and a charge/discharge rate of 1.5 C in an environment having a temperature of 25° C. The discharge capacity of the $1^{st}$ cycle was defined as X1, and the discharge capacity of the $100^{th}$ cycle was defined as X2.

A capacity maintenance rate ΔC was calculated using the discharge capacity X1 and the discharge capacity X2 (ΔC= (X2/X1)×100(%)) and was evaluated by the following standard. A larger value for the capacity maintenance rate ΔC indicates that the secondary battery has better cycle characteristics.

A: Capacity maintenance rate ΔC of 93% or more

B: Capacity maintenance rate ΔC of not less than 90% and less than 93%

C: Capacity maintenance rate ΔC of not less than 87% and less than 90%

D: Capacity maintenance rate ΔC of less than 87%

<Output Characteristics>

A lithium ion secondary battery produced as an electrochemical device in each example or comparative example was constant-current constant-voltage (CC-CV) charged to 4.40 V in an atmosphere having a temperature of 25° C. for cell preparation. Prepared cells were discharged to 3.0 V by 0.2 C and 3.0 C constant-current methods, and the electric capacities thereof were determined. A discharge capacity maintenance rate expressed by the ratio of the electric capacities (=(electric capacity at 3.0 C/electric capacity at 0.2 C)×100(%)) was calculated. This measurement was performed for 5 lithium ion secondary battery cells. An average value of the discharge capacity maintenance rates for these cells was calculated and was evaluated by the following standard. A larger average value for the discharge capacity maintenance rate indicates that the secondary battery has better output characteristics.

A: Average value for discharge capacity maintenance rate of 90% or more

B: Average value for discharge capacity maintenance rate of not less than 85% and less than 90%

C: Average value for discharge capacity maintenance rate of not less than 75% and less than 85%

D: Average value for discharge capacity maintenance rate of less than 75%

Example 1

<Production of Seed Particles (A1)>

A reactor including a stirrer was charged with 900 parts of deionized water, 72.5 parts of styrene as an aromatic vinyl monomer, 27.0 parts of butyl acrylate as a (meth)acrylic acid ester monomer, 0.5 parts of ethylene glycol dimethacrylate as a cross-linkable monomer, 0.5 parts of 2,2'-azobis[N-(2-carboxyethyl)-2-methylpropionamidine] (VA-057 produced by FUJIFILM Wako Pure Chemical Corporation) as a polymerization initiator, and ammonia/ammonium chloride as a pH buffer such that the pH in the system was 8.2. These materials were thoroughly stirred, were then heated to 70° C., and a reaction was caused to proceed for 7 hours. A water dispersion containing seed particles (A1) that was obtained in this manner was then cooled to 30° C. or lower. The obtained seed particles (A1) had a volume-average particle diameter (Dv) of 0.8 μm and a particle diameter distribution (Dv/Dn) of 1.02.

<Production of Particulate Polymer (A1)>

A vessel including a stirrer was charged with 1,000 parts of deionized water, 2.5 parts of sodium dodecyl sulfate as an emulsifier, and 200 parts of dibutyl phthalate as a hydrophobic compound. These materials were thoroughly stirred to obtain a dispersion liquid. The obtained dispersion liquid was subjected to 1 minute of high-shear stirring at a rotation speed of 15,000 rpm using an inline emulsifying/dispersing device (CAVITRON produced by Pacific Machinery & Engineering Co., Ltd.) to produce a dispersion liquid in which the dibutyl phthalate formed fine droplets. In addition, 100 parts in terms of solid content of the dispersion liquid of the seed particles (A1) and acetone in an amount such as to have a ratio with deionized water of 10 mass % were added and were stirred therewith at 35° C. for 10 hours to cause absorption of dibutyl phthalate by the seed particles (A1). Thereafter, acetone was evaporated through processing under reduced pressure, and then deionized water was added to produce a water dispersion in which non-volatile components were 10 mass %.

A reactor including a stirrer was charged with 27 parts of the above-described water dispersion, 110 parts of deionized water, 0.2 parts of sodium dodecylbenzenesulfonate as an emulsifier, 72.5 parts of styrene as an aromatic vinyl monomer, 27.0 parts of butyl acrylate as a (meth)acrylic acid ester monomer, 0.5 parts of ethylene glycol dimethacrylate as a cross-linkable monomer, and 2 parts of t-butyl peroxy-2-ethylhexanoate (PERBUTYL O produced by NOF Corporation) as a polymerization initiator, and was used to stir these materials at 30° C. for 2 hours. In addition, 220 parts of deionized water was added, heating was performed to 90° C., and a reaction was caused to proceed for 4 hours. A water dispersion containing a particulate polymer (A1) that was obtained in this manner was then cooled to 30° C. or lower. The obtained particulate polymer (A1) had a volume-average particle diameter (Dv) of 5 μm, a particle diameter distribution (Dv/Dn) of 1.02, and a glass-transition temperature of 60° C.

<Production of Water Dispersion Containing Binder>

A reactor including a stirrer was supplied with 70 parts of deionized water, 0.15 parts of sodium lauryl sulfate (EMAL® 2 F (EMAL is a registered trademark in Japan, other countries, or both) produced by Kao Corporation) as an emulsifier, and 0.5 parts of ammonium persulfate as a polymerization initiator, the gas phase was purged with nitrogen gas, and the temperature was raised to 60° C.

Meanwhile, a monomer composition was produced in a separate vessel by mixing 50 parts of deionized water, 0.5 parts of sodium dodecylbenzenesulfonate as a dispersion stabilizer, 94 parts of n-butyl acrylate as a (meth)acrylic acid ester monomer, 2 parts of methacrylic acid as an acid group-containing monomer, 2 parts of acrylonitrile as a nitrile group-containing monomer, and 1 part of allyl methacrylate and 1 part of allyl glycidyl ether as cross-linkable monomers.

The obtained monomer composition was continuously added into the above-described reactor including a stirrer over 4 hours to perform polymerization. The reaction was carried out at 60° C. during the addition. Once the addition was complete, a further 3 hours of stirring was performed at 70° C., and then the reaction was ended to yield a water dispersion containing a particulate binder as an acrylic polymer. The obtained particulate binder had a volume-average particle diameter of 0.25 μm and a glass-transition temperature of –30° C.

<Production of Composition for Electrochemical Device Functional Layer>

A pre-mixing slurry was obtained by adding 0.5 parts of polyacrylic acid as a dispersant to 100 parts of alumina (AKP3000 produced by Sumitomo Chemical Co., Ltd.; volume-average particle diameter: 0.7 μm) as inorganic particles that are non-conductive heat-resistant particles, further adding deionized water such that the solid content concentration was 55 mass %, and performing mixing using a ball mill.

In addition, 0.2 parts of sodium dodecylbenzenesulfonate (NEOPELEX G-15 produced by Kao Corporation) as an emulsifier, 6 parts in terms of solid content of the water dispersion containing the binder obtained as described above, and 1.5 parts of carboxymethyl cellulose as a thickener were mixed with 100 parts of solid content of the particulate polymer (A1) obtained as described above such that the solid content concentration was 40 mass %, and then the resultant mixture was added to the pre-mixing slurry obtained as described above. Deionized water was further added to adjust the solid content concentration to 40 mass % and yield a slurry composition as a composition for an electrochemical device functional layer.

Note that the volume mixing ratio of inorganic particles (alumina) and the particulate polymer (A1) in the obtained slurry composition was 7:1.5 (non-conductive heat-resistant particles/particulate polymer≈4.7).

<Production of Functional Layer-Equipped Separator>

A microporous membrane (thickness: 12 μm) made of polyethylene was prepared as a separator substrate. The slurry composition obtained as described above was applied onto one side of the separator substrate by bar coating. Next, the separator substrate with the slurry composition applied thereon was dried at 50° C. for 1 minute to form a functional layer. The same operations were performed with respect to the other side of the separator substrate to produce a functional layer-equipped separator (laminate for an electrochemical device) that included functional layers at both sides of the separator substrate. The thickness of a non-conductive heat-resistant particle layer included in a functional layer of the obtained laminate was measured as previously described. The result is shown in Table 1.

<Production of Positive Electrode>

A slurry composition for a positive electrode was produced by mixing 100 parts of $LiCoO_2$ (volume-average particle diameter: 12 μm) as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone as a solvent, adjusting the total solid content concentration to 70 mass %, and mixing these materials in a planetary mixer.

The slurry composition for a positive electrode was applied onto aluminum foil of 10 μm in thickness serving as a current collector by a comma coater such as to have a thickness after drying of approximately 150 μm. The slurry composition for a positive electrode was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a post-pressing positive electrode including a positive electrode mixed material layer (thickness: 60 μm).

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the reaction and yield a mixture containing a binder (SBR) for a negative electrode mixed material layer. The mixture containing the binder for a negative electrode mixed material layer was adjusted to pH 8 through addition of 5% sodium hydroxide aqueous solution, and was then subjected to thermal-vacuum distillation to remove unreacted monomer. Thereafter, the mixture was cooled to 30° C. or lower to obtain a water dispersion containing the target binder for a negative electrode mixed material layer.

After mixing 97.5 parts of artificial graphite (volume-average particle diameter: 15.6 μm) as a negative electrode active material, 1.0 parts in terms of solid content of a 2% aqueous solution of carboxymethyl cellulose sodium salt (MAC350HC produced by Nippon Paper Industries Co., Ltd.) as a viscosity modifier, and deionized water and adjusting the solid content concentration thereof to 68%, a further 60 minutes of mixing was performed at 25° C. The solid content concentration was further adjusted to 62% with deionized water, and a further 15 minutes of mixing was performed at 25° C. to obtain a mixture. Deionized water and 1.5 parts in terms of solid content of the water dispersion of the binder for a negative electrode mixed material layer were added to this mixture, the final solid content concentration was adjusted to 52%, and a further 10 minutes of mixing was performed to obtain a mixture. This mixture was subjected to defoaming under reduced pressure to yield a slurry composition for a negative electrode having good fluidity.

The slurry composition for a negative electrode was applied onto copper foil of 6 μm in thickness serving as a current collector by a comma coater such as to have a thickness after drying of approximately 150 μm. The slurry composition for a negative electrode was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode including a negative electrode mixed material layer (thickness: 80 μm).

The functional layer-equipped separator, positive electrode, and negative electrode obtained as described above were used to evaluate the dry adhesiveness, wet adhesiveness, and ratio of good products as previously described. The results are shown in Table 1.

<Production of Lithium Ion Secondary Battery>

The post-pressing positive electrode produced as described above was cut out as a rectangle of 49 cm×5 cm and was placed with the surface at the positive electrode mixed material layer-side thereof facing upward. A functional layer-equipped separator that had been cut out as 120 cm×5.5 cm was then arranged on the positive electrode mixed material layer such that the positive electrode was positioned at one longitudinal direction side of the functional layer-equipped separator. In addition, the post-pressing negative electrode produced as described above was cut out as a rectangle of 50 cm×5.2 cm and was arranged on the functional layer-equipped separator such that the surface at the negative electrode mixed material layer-side thereof faced toward the functional layer-equipped separator and such that the negative electrode was positioned at the other longitudinal direction side of the functional layer-equipped separator. The resultant laminate was wound by a roller to obtain a roll. This roll was pressed into a flat form at 70° C. and 1 MPa, was subsequently enclosed in an aluminum packing case serving as a battery case, and then electrolyte solution (solvent: ethylene carbonate/diethyl carbonate/vinylene carbonate (volume ratio)=68.5/30/1.5; electrolyte: LiPF$_6$ of 1 M in concentration) was injected such that no air remained. An opening of the aluminum packing case was then closed by heat sealing at a temperature of 150° C. to thereby produce a wound lithium ion secondary battery having a capacity of 800 mAh as an electrochemical device.

The obtained lithium ion secondary battery was used to evaluate cycle characteristics and output characteristics. The results are shown in Table 1.

Example 2

Various operations, measurements, and evaluations were performed in the same way as in Example 1 with the exception that a particulate polymer (A2) produced as described below was used instead of the particulate polymer (A1) in the step of "Production of composition for electrochemical device functional layer". The results are shown in Table 1.

<Production of Seed Particles (A2)>

A reactor including a stirrer was charged with 900 parts of ethanol, 72.5 parts of styrene as an aromatic vinyl monomer, 27.0 parts of butyl acrylate as a (meth)acrylic acid ester monomer, 0.5 parts of ethylene glycol dimethacrylate as a cross-linkable monomer, 1.0 parts of t-butyl peroxy-2-ethylbutanoate (produced by Kayaku Akzo Corporation; product name: Trigonox 27) as a polymerization initiator, and 1.0 parts of polyvinylpyrrolidone as a dispersion stabilizer. These materials were thoroughly stirred, were then heated to 70° C., and a reaction was caused to proceed for 7 hours. In addition, 1,000 parts of deionized water was added, ethanol was evaporated through processing under reduced pressure, and the water dispersion containing seed particles (A2) was then cooled to 30° C. or lower. The obtained seed particles (A2) had a volume-average particle diameter (Dv) of 0.8 μm and a particle diameter distribution (Dv/Dn) of 1.04.

<Production of Particulate Polymer (A2)>

A particulate polymer (A2) was produced in the same way as in Example 1 with the exception that the seed particles (A2) were used instead of the seed particles (A1). The obtained particulate polymer (A2) had a volume-average particle diameter (Dv) of 5 μm and a particle diameter distribution (Dv/Dn) of 1.05.

Example 3

Various operations, measurements, and evaluations were performed in the same way as in Example 1 with the exception that a particulate polymer (A3) produced as described below through suspension polymerization accompanied by classification was used instead of the particulate polymer (A1) in the step of "Production of composition for electrochemical device functional layer". The results are shown in Table 1.

<Production of Particulate Polymer (A3)>

An aqueous solution of 8.0 parts of magnesium chloride dissolved in 200 parts of deionized water was added into a reactor including a stirrer, and then an aqueous solution of 5.6 parts of sodium hydroxide dissolved in 50 parts of deionized water was gradually added under stirring to produce a colloidal dispersion liquid containing magnesium hydroxide as a metal hydroxide. After adding 72.5 parts of styrene as an aromatic vinyl monomer, 27.0 parts of butyl acrylate as a (meth)acrylic acid ester monomer, and 0.5 parts of ethylene glycol dimethacrylate as a cross-linkable monomer to the colloidal dispersion liquid and performing further stirring thereof, 2.0 parts of t-butyl peroxy-2-ethylhexanoate (PERBUTYL 0 produced by NOF Corporation) was added as a polymerization initiator to obtain a mixture. The obtained mixture was subjected to 1 minute of high-shear stirring at a rotation speed of 15,000 rpm using an inline emulsifying/dispersing device (CAVITRON produced by Pacific Machinery & Engineering Co., Ltd.) to form droplets of a monomer composition in the colloidal dispersion liquid containing magnesium hydroxide. This dispersion liquid was heated to 90° C., and a polymerization reaction was performed for 5 hours to yield a water dispersion containing a particulate polymer (A3). Sulfuric acid was added dropwise to the obtained water dispersion containing the particulate polymer (A3) under stirring at room temperature (25° C.) so as to perform acid washing until the pH reached 6.5 or lower. Next, separation by filtration was performed, 500 parts of deionized water was added to the obtained solid content, a slurry was formed once again, and water washing treatment (washing, filtration, and dehydration) was repeated a number of times. Next, a classifier was used to remove fine particles and coarse particles and thereby produce a particulate polymer (A3). The obtained particulate polymer (A3) had a volume-average particle diameter (Dv) of 5 μm and a particle diameter distribution (Dv/Dn) of 1.09.

Example 4

Various operations, measurements, and evaluations were performed in the same way as in Example 1 with the exception that in the step of "Production of composition for electrochemical device functional layer", the volume mixing ratio of inorganic particles (alumina) as non-conductive heat-resistant particles and the particulate polymer (A1) was set as 7:2 (non-conductive heat-resistant particles/particulate polymer=3.5) so as to change the thickness of the non-conductive heat-resistant particle layer included in the obtained functional layer as indicated in Table 1 (3 μm). The results are shown in Table 1.

Example 5

Various operations, measurements, and evaluations were performed in the same way as in Example 1 with the exception that in the step of "Production of composition for electrochemical device functional layer", a particulate polymer (A4) produced as described below was used instead of the particulate polymer (A1) and the volume mixing ratio of inorganic particles (alumina) as non-conductive heat-resistant particles and the particulate polymer (A4) was set as 7:2 (non-conductive heat-resistant particles/particulate polymer=3.5) so as to change the thickness of the non-conductive heat-resistant particle layer included in the obtained functional layer as indicated in Table 1 (3 μm). The results are shown in Table 1.

<Production of Particulate Polymer (A4)>

The amounts of monomers and polymerization initiator added in production of a particulate polymer were set as different amounts to those in the step of "Production of particulate polymer (A1)" in Example 1. Specifically, 37.1 parts of styrene as an aromatic vinyl monomer, 13.8 parts of butyl acrylate as a (meth)acrylic acid ester monomer, 0.26 parts of ethylene glycol dimethacrylate as a cross-linkable monomer, and 1 part of t-butyl peroxy-2-ethylhexanoate (PERBUTYL 0 produced by NOF Corporation) as a polymerization initiator were compounded. With the exception of these points, operations were performed in the same way as in Example 1 to produce a particulate polymer (A4) having a volume-average particle diameter (Dv) of 4 μm and a particle diameter distribution (Dv/Dn) of 1.02.

Example 6

Various operations, measurements, and evaluations were performed in the same way as in Example 1 with the exception that in the step of "Production of composition for electrochemical device functional layer", a particulate polymer (A5) produced as described below was used instead of the particulate polymer (A1) and the volume mixing ratio of inorganic particles (alumina) as non-conductive heat-resistant particles and the particulate polymer (A5) was set as 7:3 (non-conductive heat-resistant particles/particulate polymer≈2.3) so as to change the thickness of the non-conductive heat-resistant particle layer included in the obtained functional layer as indicated in Table 1 (2 μm). The results are shown in Table 1.

<Production of Particulate Polymer (A5)>

The amounts of monomers and polymerization initiator added in production of a particulate polymer were set as different amounts to those in the step of "Production of particulate polymer (A1)" in Example 1. Specifically, 15.7 parts of styrene as an aromatic vinyl monomer, 5.8 parts of butyl acrylate as a (meth)acrylic acid ester monomer, 0.11 parts of ethylene glycol dimethacrylate as a cross-linkable monomer, and 0.4 parts of t-butyl peroxy-2-ethylhexanoate (PERBUTYL 0 produced by NOF Corporation) as a polymerization initiator were compounded. With the exception of these points, operations were performed in the same way as in Example 1 to produce a particulate polymer (A5) having a volume-average particle diameter (Dv) of 3 μm and a particle diameter distribution (Dv/Dn) of 1.02.

Example 7

Various operations, measurements, and evaluations were performed in the same way as in Example 1 with the exception that the inorganic particles compounded as non-conductive heat-resistant particles were changed to boehmite (H43M produced by Showa Denko K.K.; volume-average particle diameter: 0.8 μm) in the step of "Production of composition for electrochemical device functional layer". The results are shown in Table 1.

Example 8

Various operations, measurements, and evaluations were performed in the same way as in Example 1 with the exception that the inorganic particles compounded as non-conductive heat-resistant particles were changed to barium sulfate (TS-2 produced by Takehara Kagaku Kogyo Co., Ltd.; volume-average particle diameter: 0.3 μm) in the step of "Production of composition for electrochemical device functional layer". The results are shown in Table 1.

Example 9

Various operations, measurements, and evaluations were performed in the same way as in Example 1 with the exception that the inorganic particles compounded as non-conductive heat-resistant particles were changed to magnesium hydroxide (MAGSEEDS X-6F produced by Konoshima Chemical Co., Ltd.; volume-average particle diameter: 0.7 μm) in the step of "Production of composition for electrochemical device functional layer". The results are shown in Table 1.

Example 10

Various operations, measurements, and evaluations were performed in the same way as in Example 1 with the exception that the inorganic particles compounded as non-conductive heat-resistant particles were changed to organic particles produced as described below in the step of "Production of composition for electrochemical device functional layer". The results are shown in Table 1.

<Production of Organic Particles as Non-Conductive Heat-Resistant Particles>

A reactor A including a stirrer was charged with 0.20 parts of sodium dodecyl sulfate, 0.30 parts of ammonium persulfate, and 180 parts of deionized water. These materials were mixed to obtain a mixture and were heated to 65° C. Meanwhile, a monomer composition for seed particles was produced in a separate vessel by mixing 80.0 parts of n-butyl acrylate, 10.0 parts of methacrylic acid, 10.0 parts of acrylonitrile, 0.8 parts of sodium dodecyl sulfate, and 40 parts of deionized water.

This monomer composition for seed particles was continuously added into the above-described reactor A over 4 hours to perform a polymerization reaction. A temperature of 65° C. was maintained inside the reactor during continuous addition of the monomer composition for seed particles. Once the continuous addition was complete, the polymerization reaction was continued for a further 3 hours at 80° C. In this manner, a water dispersion of seed particles was obtained. The volume-average particle diameter of the seed particles, as measured in the same manner as for measurement of the volume-average particle diameter of a particulate polymer or binder, was 120 nm.

Next, a reactor including a stirrer was charged with 20 parts in terms of solid content of the water dispersion of the seed particles described above (among which, 16 parts was n-butyl acrylate units, 2 parts was methacrylic acid units, and 2 parts was acrylonitrile units), 80 parts of ethylene glycol dimethacrylate (Kyoeisha Chemical Co., Ltd.; product name: LIGHT ESTER EG) as a polyfunctional ethylenically unsaturated monomer, 0.8 parts of sodium dodecylbenzenesulfonate, 3.2 parts of t-butyl peroxy-2-ethylhexanoate (produced by NOF Corporation; product name: PERBUTYL 0) as a polymerization initiator, and 160 parts of deionized water, and these materials were stirred at 35° C. for 12 hours to cause complete absorption of the polyfunctional ethylenically unsaturated monomer and the polymerization initiator by the seed particles. Thereafter, a temperature of 90° C. was maintained inside the reactor while performing a polymerization reaction (seeded polymerization) for 5 hours to yield a water dispersion of organic particles. The obtained organic particles had a volume-average particle diameter of 200 nm and a glass-transition temperature of higher than 200° C. Note that the volume-average particle diameter and the glass-transition temperature of the organic particles were measured in the same manner as in measurement of the volume-average particle diameter of a particulate polymer or binder.

Example 11

Various operations, measurements, and evaluations were performed in the same way as in Example 1 with the exception that in the step of "Production of composition for electrochemical device functional layer", a particulate polymer (A6) produced as described below was used instead of the particulate polymer (A1) and the volume mixing ratio of inorganic particles (alumina) as non-conductive heat-resistant particles and the particulate polymer (A6) was set as 7:3 (non-conductive heat-resistant particles/particulate polymer≈2.3) so as to change the thickness of the non-conductive heat-resistant particle layer included in the obtained functional layer as indicated in Table 1 (2 μm). The results are shown in Table 1.
<Production of Particulate Polymer (A6)>

The amounts of monomers and polymerization initiator added in production of a particulate polymer were set as different amounts to those in the step of "Production of particulate polymer (A1)" in Example 1. Specifically, 125.3 parts of styrene as an aromatic vinyl monomer, 46.7 parts of butyl acrylate as a (meth)acrylic acid ester monomer, 0.86 parts of ethylene glycol dimethacrylate as a cross-linkable monomer, and 3 parts of t-butyl peroxy-2-ethylhexanoate (PERBUTYL O produced by NOF Corporation) as a polymerization initiator were compounded. With the exception of these points, operations were performed in the same way as in Example 1 to produce a particulate polymer (A6) having a volume-average particle diameter Dv of 6 μm and a particle diameter distribution (Dv/Dn) of 1.02.

Comparative Example 1

Various operations, measurements, and evaluations were performed in the same way as in Example 1 with the exception that a particulate polymer (B) produced as described below through suspension polymerization not accompanied by classification was used instead of the particulate polymer (A) in the step of "Production of composition for electrochemical device functional layer". The results are shown in Table 1.
<Production of Particulate Polymer (B)>

A particulate polymer (B) was produced by omitting classification by a classifier from the step of "Production of particulate polymer (A3)" described in Example 3. The obtained particulate polymer (B) had a volume-average particle diameter (Dv) of 5 μm and a particle diameter distribution (Dv/Dn) of 1.34.

In Table 1:
"St" indicates styrene unit;
"BA" indicates butyl acrylate unit;
"EGDMA" indicates ethylene glycol dimethacrylate unit;
"Dv" indicates volume-average particle diameter of particulate polymer; and
"Dn" indicates number-average particle diameter of particulate polymer.

TABLE 1

| | | | Examples | | | | | |
| --- | --- | --- | --- | --- | --- | --- | --- | --- |
| | | | 1 | 2 | 3 | 4 | 5 | 6 |
| Composition for functional layer | Particulate polymer | Chemical composition | | | ST/BA/EGDMA | | | |
| | | ID | A1 | A2 | A3 | A1 | A4 | A5 |
| | | Inclusion of (meth)acrylic acid ester monomer unit | | | Yes | | | |
| | | Particle diameter distribution (Dv/Dn) [—] | 1.02 | 1.05 | 1.09 | 1.02 | 1.02 | 1.02 |
| | | Volume-average particle diameter (Dv) [μm] | 5 | 5 | 5 | 5 | 4 | 3 |
| | | Glass-transition temperature [° C.] | 60 | 60 | 60 | 60 | 60 | 60 |
| | | Production method — Polymerization method | Swollen seed emulsion polymerization | Swollen seed emulsion polymerization | Suspension polymerization | Swollen seed emulsion polymerization | | |
| | | Seed particles | Soap-free emulsion polymerization | Emulsion polymerization | — | Soap-free emulsion polymerization | | |
| | | Classification | — | — | Yes | | — | |
| | Binder | Form | | | Particulate | | | |
| | | Glass-transition temperature [° C.] | | | −30 | | | |
| | Non-conductive heat-resistant particles | Type | Alumina | Alumina | Alumina | Alumina | Alumina | Alumina |
| Functional layer | | Thickness of non-conductive heat-resistant particle layer [μm] | 4 | 4 | 4 | 3 | 3 | 2 |
| | | Volume-average particle diameter Dv of particulate polymer/Thickness of non-conductive heat-resistant particle layer [—] | 1.25 | 1.25 | 1.25 | 1.67 | 1.33 | 1.5 |

TABLE 1-continued

| | | | | | | | | |
|---|---|---|---|---|---|---|---|---|
| | | Buried fraction [%] | 1 | 10 | 22 | 0 | 0 | 0 |
| Laminate | | Substrate | | | Separator | | | |
| | | Arrangement configuration | Both sides | Both sides | Both sides | Both sides | Both sides | Both sides |
| Evaluation | | Dry adhesiveness | A | A | B | A | A | B |
| | | Wet adhesiveness | A | B | B | A | A | A |
| | | Ratio of good products | A | A | B | A | A | B |
| | | Output characteristics | A | A | B | A | A | A |
| | | Cycle characteristics | A | B | B | A | A | A |

| | | | Examples | | | | | Comparative example |
|---|---|---|---|---|---|---|---|---|
| | | | 7 | 8 | 9 | 10 | 11 | 1 |
| Composition for functional layer | Particulate polymer | Chemical composition | | | ST/BA/EGDMA | | | |
| | | ID | A1 | A1 | A1 | A1 | A6 | B |
| | | Inclusion of (meth)acrylic acid ester monomer unit | | | Yes | | | |
| | | Particle diameter distribution (Dv/Dn) [—] | 1.02 | 1.02 | 1.02 | 1.02 | 1.02 | 1.34 |
| | | Volume-average particle diameter (Dv) [μm] | 5 | 5 | 5 | 5 | 6 | 5 |
| | | Glass-transition temperature [° C.] | 60 | 60 | 60 | 60 | 60 | 60 |
| | Production method | Polymerization method | | Swollen seed emulsion polymerization | | | | Suspension polymerization |
| | | Seed particles | | Soap-free emulsion polymerization | | | | — |
| | | Classification | | | — | | | No |
| | Binder | Form | | | Particulate | | | |
| | | Glass-transition temperature [° C.] | | | −30 | | | |
| | Non-conductive heat-resistant particles | Type | Boehmite | Barium sulfate | Magnesium hydroxide | Organic particles | Alumina | Alumina |
| Functional layer | | Thickness of non-conductive heat-resistant particle layer [μm] | 4 | 4 | 4 | 4 | 2 | 4 |
| | | Volume-average particle diameter Dv of particulate polymer/Thickness of non-conductive heat-resistant particle layer [—] | 1.25 | 1.25 | 1.25 | 1.25 | 3 | 1.25 |
| | | Buried fraction [%] | 1 | 1 | 1 | 1 | 0 | 57 |
| Laminate | | Substrate | | | Separator | | | |
| | | Arrangement configuration | Both sides | Both sides | Both sides | Both sides | Both sides | Both sides |
| Evaluation | | Dry adhesiveness | A | A | A | A | B | D |
| | | Wet adhesiveness | A | A | A | A | B | D |
| | | Ratio of good products | A | A | A | A | B | D |
| | | Output characteristics | A | A | A | B | B | C |
| | | Cycle characteristics | A | A | A | B | B | C |

It can be seen from Table 1 that in Examples 1 to 11 in which the used composition for an electrochemical device functional layer contained non-conductive heat-resistant particles and a particulate polymer and in which a particle diameter distribution value (Dv/Dn) of the particulate polymer was not less than 1.00 and less than 1.10, it was possible to form a functional layer that had excellent dry adhesiveness and wet adhesiveness and that could impart excellent output characteristics and cycle characteristics to an electrochemical device.

It can also be seen that in Comparative Example 1 in which the used composition for a functional layer contained non-conductive heat-resistant particles and a particulate polymer having a particle diameter distribution value (Dv/Dn) of 1.10 or more, it was not possible to form a functional layer that had excellent dry adhesiveness and wet adhesiveness and that could impart excellent output characteristics and cycle characteristics to an electrochemical device.

INDUSTRIAL APPLICABILITY

According to the present disclosure, it is possible to provide a composition for a functional layer with which it is possible to form a functional layer that has excellent adhesiveness and can impart excellent output characteristics and cycle characteristics to an electrochemical device.

Moreover, according to the present disclosure, it is possible to provide a functional layer for an electrochemical device that has excellent adhesiveness and can impart excellent output characteristics and cycle characteristics to an electrochemical device.

Furthermore, according to the present disclosure, it is possible to provide a laminate for an electrochemical device that can impart excellent output characteristics and cycle characteristics to an electrochemical device.

Also, according to the present disclosure, it is possible to provide an electrochemical device that can display excellent output characteristics and cycle characteristics.

The invention claimed is:

1. A functional layer for an electrochemical device, comprising: a non-conductive heat-resistant particle layer containing non-conductive heat-resistant particles; and a particulate polymer, wherein the particulate polymer is dispersed in the non-conductive heat-resistant particle layer, the particulate polymer has a particle diameter distribution value, expressed by Dv/Dn, of not less than 1.00 and less than 1.10, where Dv is a value for volume-average particle diameter of the particulate polymer and Dn is a value for number-average particle diameter of the particulate polymer, and a buried fraction of the particulate polymer in the non-conductive heat-resistant particle layer is 30% or less, wherein the buried fraction is a value that indicates a proportion of the number of particles of the particulate polymer that are buried in the non-conductive heat-resistant particle layer among 100 arbitrarily selected particles of the particulate polymer contained in the functional layer, and a particle of the particulate polymer is determined to be buried when the particle is completely buried in the non-conductive heat-resistant particle layer and does not have a section protruding from a surface of the non-conductive heat-resistant particle layer.

2. The functional layer for an electrochemical device according to claim 1, wherein a value obtained by dividing the volume-average particle diameter Dv of the particulate polymer by layer thickness of the non-conductive heat-resistant particle layer is not less than 0.75 and not more than 4.00.

3. The functional layer for an electrochemical device according to claim 2, wherein the value obtained by dividing the volume-average particle diameter Dv of the particulate polymer by the layer thickness of the non-conductive heat-resistant particle layer is more than 1.00.

4. A laminate for an electrochemical device comprising the functional layer for an electrochemical device according to claim 1 stacked on a substrate.

5. An electrochemical device comprising the functional layer for an electrochemical device according to claim 1.

* * * * *